(12) United States Patent
Ferreira Orta et al.

(10) Patent No.: US 10,086,734 B2
(45) Date of Patent: Oct. 2, 2018

(54) VEHICLE BEVERAGE HOLDER ASSEMBLY

(71) Applicant: Ford Global Technologies, LLC, Dearborn, MI (US)

(72) Inventors: Miguel David Ferreira Orta, Toluca Estao (MX); Adrian Diaz Morales, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 45 days.

(21) Appl. No.: 15/051,770

(22) Filed: Feb. 24, 2016

(65) Prior Publication Data

US 2017/0240085 A1     Aug. 24, 2017

(51) Int. Cl.
*A47K 1/08*     (2006.01)
*B60N 3/10*     (2006.01)

(52) U.S. Cl.
CPC ..................... *B60N 3/10* (2013.01)

(58) Field of Classification Search
CPC .. A01K 5/0114; A01K 7/005; A47G 23/0225; B60N 3/10; A63B 27/00; A63B 55/00
USPC ................... 248/311.2; 224/406, 545
See application file for complete search history.

(56) References Cited

U.S. PATENT DOCUMENTS

| | | | |
|---|---|---|---|
| 2,893,675 A | 7/1959 | Smith et al. | |
| 3,837,308 A * | 9/1974 | Harvey | B63B 35/44 114/264 |
| 3,842,981 A | 10/1974 | Lambert | |
| 4,434,961 A * | 3/1984 | Hoye | B60N 3/10 108/44 |
| 4,696,285 A * | 9/1987 | Zwach | F24S 30/40 126/604 |
| 4,819,843 A | 4/1989 | Nakayama | |
| 4,826,058 A | 5/1989 | Nakayama | |
| 4,972,982 A * | 11/1990 | Harbour | A45F 5/00 224/148.4 |
| 5,165,646 A * | 11/1992 | Gewecke | B60N 3/103 165/80.1 |
| 5,238,211 A * | 8/1993 | Borovski | A47G 23/0225 224/483 |
| 5,484,129 A * | 1/1996 | Megal | A63B 55/408 224/274 |
| 5,511,755 A * | 4/1996 | Spykerman | B60N 3/108 220/23.8 |
| 5,664,718 A * | 9/1997 | Vine | B60N 3/103 224/413 |
| 6,983,918 B1 * | 1/2006 | Leasure | A63B 27/00 248/274.1 |

(Continued)

OTHER PUBLICATIONS

Victor Hugo, Maksimatic—The Better Cup Holder (http://www.maksimatic.com), 2016, 5 pages.

*Primary Examiner* — Kimberly T Wood
(74) *Attorney, Agent, or Firm* — Vichit Chea; Brooks Kushman, P.C.

(57) ABSTRACT

A beverage container holder may include a beverage container receptacle, a gimbal set including outer, middle and inner gimbals surrounding and connected to the receptacle to correct a position of the receptacle in response to an external force, and an inner cover extending from the inner gimbal and having a first position extending over at least a portion of the middle gimbal and a second position contacting the middle gimbal to inhibit the external force.

15 Claims, 4 Drawing Sheets

(56) References Cited

U.S. PATENT DOCUMENTS

| | | | | |
|---|---|---|---|---|
| 7,328,876 B2 * | 2/2008 | Jones | ................... | B60N 3/107 |
| | | | | 220/694.1 |
| 7,611,115 B2 | 11/2009 | Kniazyszcze et al. | | |
| 8,146,534 B1 * | 4/2012 | Robertson | ............ | A01K 5/0114 |
| | | | | 119/61.54 |
| 8,233,995 B2 * | 7/2012 | Coe | ..................... | A61B 5/0031 |
| | | | | 607/133 |
| 2003/0197104 A1 * | 10/2003 | Heybl | ................ | A47G 23/0225 |
| | | | | 248/311.2 |
| 2003/0226945 A1 * | 12/2003 | Pacher | .................. | B60N 3/106 |
| | | | | 248/311.2 |
| 2005/0082455 A1 * | 4/2005 | Jones | .................... | B60N 3/107 |
| | | | | 248/311.2 |
| 2005/0205740 A1 * | 9/2005 | Sturt | ..................... | B60N 3/106 |
| | | | | 248/311.2 |
| 2007/0090256 A1 * | 4/2007 | Hansen | ................. | B60N 3/101 |
| | | | | 248/311.2 |
| 2010/0193654 A1 * | 8/2010 | Mclaughlin | ............ | B60N 3/105 |
| | | | | 248/311.2 |
| 2010/0230571 A1 * | 9/2010 | Sharkey | ................ | B60N 3/101 |
| | | | | 248/311.2 |
| 2011/0240810 A1 | 10/2011 | France et al. | | |
| 2012/0273537 A1 * | 11/2012 | Newman | .................. | B62B 1/24 |
| | | | | 224/406 |

* cited by examiner

VEHICLE BEVERAGE HOLDER ASSEMBLY

TECHNICAL FIELD

Disclosed herein are vehicle beverage holder assemblies.

BACKGROUND

Vehicles often include cup holders therein to increase user satisfaction and decrease spills during use of the vehicle. Vehicle cup holders may be arranged in a various consoles within the vehicle such as front seat consoles, rear seat consoles, etc. Cup holders may also be arranged within doors of the vehicle and on a floor of the vehicle.

SUMMARY

A beverage container holder may include a beverage container receptacle, a gimbal set including outer, middle and inner gimbals surrounding and connected to the receptacle to correct a position of the receptacle in response to an external force, and an inner cover extending from the inner gimbal and having a first position extending over at least a portion of the middle gimbal and a second position contacting the middle gimbal to inhibit the external force.

A vehicle beverage holder may include a receptacle configured to receive a beverage container, a gimbal surrounding and rotatably fixed to the receptacle to correct a position of the receptacle in response to an external force, and a weight arranged at a bottom of the receptacle to counteract the external force and to inhibit the external force.

A beverage holder may include a receptacle configured to receive a beverage container, a gimbal set including outer, middle and inner gimbals surrounding and connected to the receptacle to correct a position of the receptacle in response to an external force, and an inner cover extending from the inner gimbal and, in a first position, covering a portion of the middle gimbal and an outer cover extending from the outer gimbal and covering another portion of the middle gimbal.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles often contain several beverage holders to hold cans, coffee cups, water bottles, etc. Some beverage containers are arranged in vehicle consoles, in vehicle doors, and on vehicle floors. Often times, to completely prevent spilling, beverage containers must contain a lid. This is especially the case during vehicle operation where changes in acceleration, deceleration, etc., may cause liquid within the can or cup to spill.

Described herein is a vehicle beverage container assembly including a stabilizing mechanism such as a gimbal assembly. The gimbal assembly may surround a receptacle configured to hold a beverage container such as a can, plastic bottle, insulated cup, etc. The gimbal assembly may be configured to maintain the receptacle at a position level with gravity (e.g., at a normal position), while the gimbals of the gimbal assembly move with respect to one another to account for various forces and inclines imposed by and on the vehicle. For example, the gimbal assembly may maintain the receptacle at a position level with gravity even during vehicle acceleration and braking where the receptacle may be subjected to various momentums that may typically cause the beverage therein to spill. The gimbal assembly may also maintain the receptacle at a position level with gravity while the vehicle travels upward at an incline (e.g., up a hill). Thus, the gimbal assembly may account for various external and dynamic forces and maintain the receptacle in the center thereof to prevent liquid from spilling from the beverage container.

The beverage holder assembly may include a cover arranged around the gimbal to prevent objects, dirt, etc., from coming into contact with the gimbal assembly. Furthermore, the cover may act as a stop to prevent the receptacle from over compensation or overcorrection. A weight may be arranged at or on the bottom of the receptacle below the rotational axis center to ensure that the receptacle will rebalance in a position level with gravity after a dynamic force is recognized by the gimbal assembly.

Figure 1:
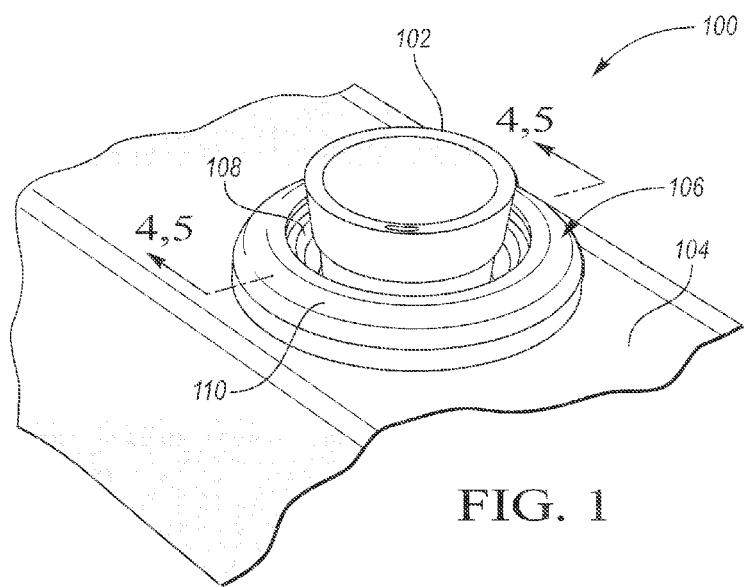
FIG. 1 illustrates an example beverage holder assembly.

FIG. 1 illustrates an example beverage holder assembly 100 configured to maintain a beverage container 102 therein. The beverage holder assembly 100 may include an outer frame 104 and a cover 106 having an inner cover 108 and an outer cover 110, both of which are discussed in more detail herein. The beverage holder assembly 100 may be arranged within a vehicle and may be configured to prevent spilling of the contents within the beverage container 102.

Figure 2:
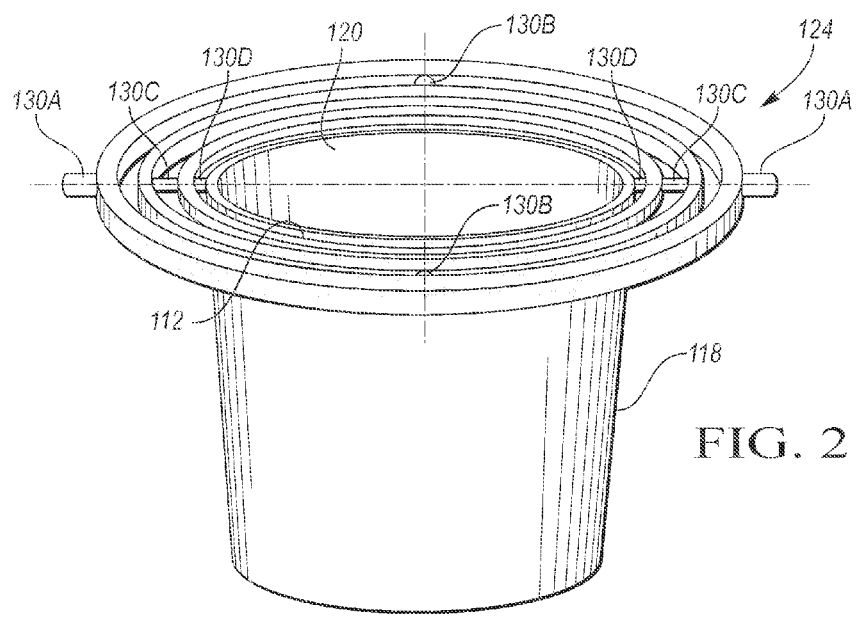
FIG. 2 illustrates a perspective view of a portion of the beverage holder assembly.

FIG. 2 illustrates a perspective view of a portion of the beverage holder assembly 100 with the outer frame 104 and cover 106 removed. The outer frame 104 may be a floor console configured to be arranged on a floor of the vehicle. The beverage holder assembly 100 may include a receptacle 118 defining an opening 120 at a rim for receiving the beverage container 102 (not shown in FIG. 2). The opening 120 may be of an appropriate size to receive various sizes of beverage containers such as cans, water bottles, coffee cups, etc. The beverage holder assembly 100 may include a gimbal assembly 124 surrounding the opening 120.

The gimbal assembly 124 may include a first outer gimbal 126A, a second middle gimbal 126B, and a third inner gimbal 126C, collectively referred to herein as gimbals 126. The gimbals 126 may be rings configured to fit one inside another. The gimbals 126 may be connected to one another by a plurality of pivots 130 (as shown as pivots 130A, 130B and 130C). A pair of first outer pivots 130A may be arranged between the first outer gimbal 126A and the outer frame 104 (not shown in FIG. 2). The first outer pivots 130A may be arranged at opposite ends of each other and may facilitate rotational movement of the first outer gimbal 126A with respect to the outer frame 104.

The second middle pivots 130B may be arranged between the first outer gimbal 126A and the second middle gimbal 126B. The second middle pivots 130B may facilitate rotational movement of the second middle gimbal 126B with respect to the first outer gimbal 126A and third inner gimbal 126C. The third inner pivots 130C may be arranged between the second middle gimbal 126B and the third inner gimbal 126C. The third inner pivots 130C may facilitate rotational movement of the third inner gimbal 126C with respect to the second middle gimbal 126B. While three gimbals 126 are shown and described herein, more or less gimbals 126 may be included as part of the gimbal assembly 124. A fourth inner pivot 130D may connect the third inner gimbal 126C to the receptacle 118.

Figure 3A:
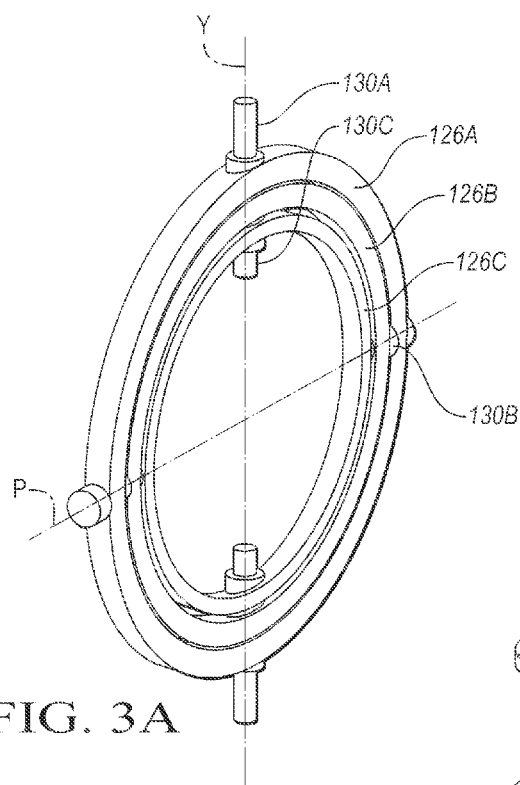
FIG. 3A illustrates an example gimbal assembly in a static state.
Figure 3B:
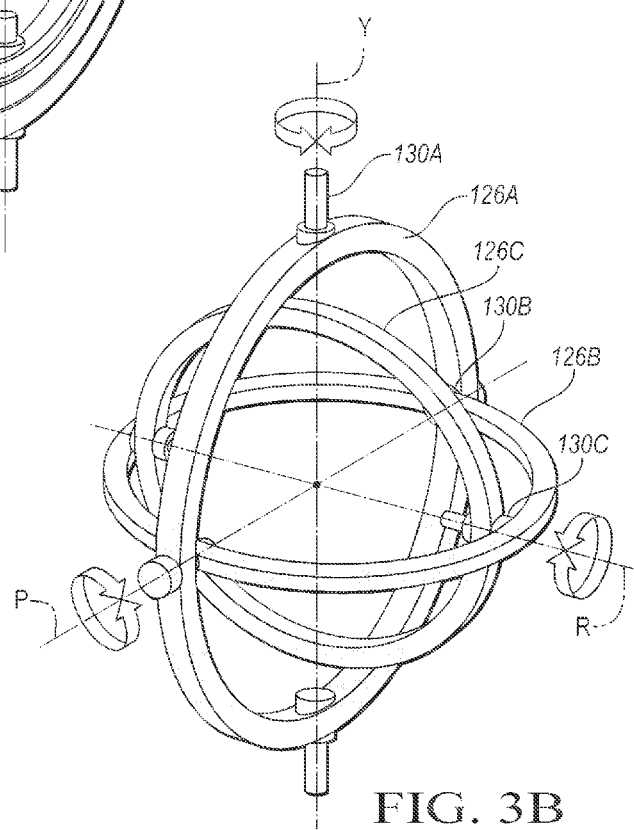
FIG. 3B illustrates an example gimbal assembly in a dynamic state.

FIG. 3A illustrates an example gimbal assembly 124 in a static state where all three gimbals 126 are aligned. FIG. 3B illustrates an example gimbal assembly 124 in a dynamic state where the gimbals 126 are rotatable at a yaw axis Y, roll axis R and pitch axis P. By mounting the gimbals 126 to each other via the pivots 130, the gimbal assembly 124 may rotate irrespective of the receptacle 118. Furthermore, the gimbals 126 may rotate around the receptacle 118.

Figure 4:
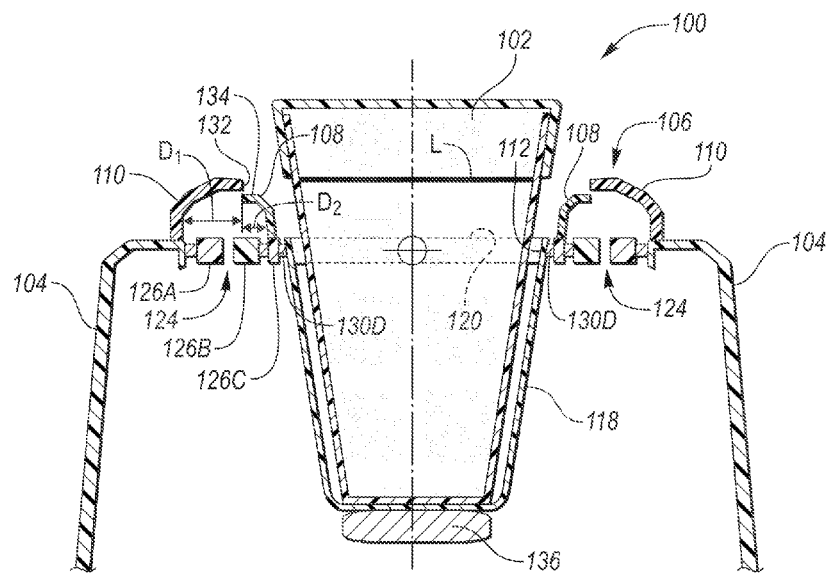
FIG. 4 illustrates a cross-sectional view of the beverage holder assembly in a static state.

FIG. 4 illustrates a cross-sectional view of the beverage holder assembly 100 of FIG. 1 in a static position. As explained, the beverage holder assembly 100 may include a receptacle 118 configured to hold a beverage container 102. The gimbal assembly 124 may be arranged around the opening 120 of the receptacle 118. The gimbal assembly 124, as explained above, may include gimbals 126 and pivots configured to allow for rotational movement of the gimbals with respect to one another.

As explained with respect to FIG. 1, the beverage holder assembly 100 may include a cover 106 including an inner cover 108 configured to be at least partially received by the outer cover 110. The inner cover 108 may be arranged on and extending from the third inner gimbal 126C. The inner cover 108 may form an arch-like shape such that the arch extends away from the opening 120. The inner cover 108 may be configured to cover at least the third inner gimbal 126C and at least a portion of the second middle gimbal 126B.

The outer cover 110 may be arranged on and extending from the first outer gimbal 126A. The outer cover 110 may form an arch-like shape such that the arch extends away from the outer frame 104 and opens towards the opening 120. The outer cover 110 may be configured to cover at least the first outer gimbal 126A and at least a portion of the second middle gimbal 126B in a first position.

The outer cover 110 may be larger and extend higher than the inner cover 108. A diameter $D_1$ of the arch of the outer cover 110 may be larger than a diameter $D_2$ of the arch of the inner cover 108. In the static position, a distal end 134 of the inner cover 108 may be spaced from a distal end 132 of the outer cover 110 such that the distal end 132 of outer cover 110 may not abut the distal end 134 of the inner cover 108.

That is, during movement of the gimbals 126, the inner and outer covers may move without obstructing or coming into contact with each other.

A weight 136 may be arranged at a bottom of the receptacle 118. The weight 136 may be configured to counteract momentum of inertia created by external forces such as those created by vehicle motions (e.g., turning, accelerating, decelerating, etc.). The weight may aid the receptacle in returning to the normal position after recognizing a momentum created by the vehicle (e.g., a dynamic force such as braking) and inhibit the external forces. The weight 136 may be a steel washer, a steal plate, or other metal. The weight 136 may also be any other material that adds mass to the receptacle. In one example, the weight 136 may weigh approximately 0.22 lbs. The weight 136 may be soldered to the bottom of the receptacle 118. It may also be placed within the receptacle, glued therein or thereto, etc.

Figure 5:
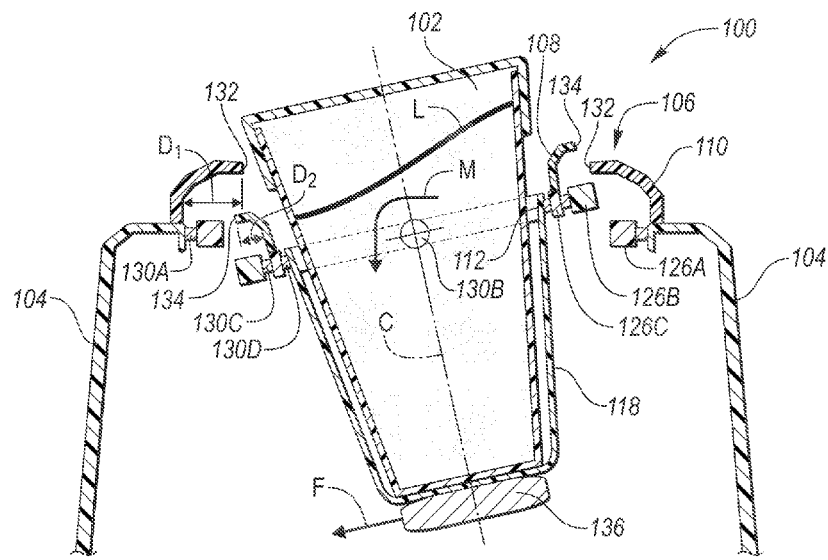
FIG. 5 illustrates another cross-sectional view of the beverage holder in a dynamic position.

FIG. 5 illustrates another cross-sectional view of the beverage holder assembly 100 of FIG. 1 in a dynamic, or second position. During operation of the vehicle, the vehicle may be exposed to various changes in momentum and dynamic forces. Such changes and forces may be a result of acceleration, deceleration, turns, etc. Beverage containers, such as beverage container 102, may be stowed with a vehicle cub holder and may be exposed to these changes in momentum. During acceleration, for example, the receptacle may realize a moment of inertia M whereby the receptacle moves within the gimbal assembly 124. After an initial dynamic force is recognized, however, the gimbal assembly 124 and the weight 136 may counteract these changes in momentum by permitting the receptacle 118 to rotate with respect to the gimbals 126 and return to a normal position (e.g., a level position relative to gravity). The gimbal assembly 124 and weight 136 may allow the center of gravity to dictate the position of the receptacle 118 relative to the gimbals 126 and inhibit the movement by the external forces. By adjusting the position of the receptacle 118, a fluid line F of the fluid within the beverage container 102 may be less affected by the changes in momentum, and spills therefrom may be prevented. Further, while some movement of the receptacle may be recognized in response to momentum created by the vehicle, the gimbal assembly 124 and the weight 136 may facilitate a smooth and relatively quick return to the normal position.

For example, in FIG. 5, a center of gravity C of the beverage container 102 may recognize a moment of inertia M in response to the vehicle increasing acceleration in a forward motion. In response to this, the receptacle 118 may tip backwards, opposite the forward motion of the vehicle. The weight 136 may counter the forward motion and apply a counter force at the receptacle to keep the receptacle from over compensating during the external dynamic force (e.g., forward motion of the vehicle). Because the gimbal assembly 124 permits the receptacle to maintain a position relative to its center of gravity, and because the weight 136 aids in returning the receptacle 118 to its normal position following a dynamic force, the beverage holder assembly 100 provides an efficient anti-spill system for vehicles.

Furthermore, the beverage holder assembly 100 may also react to variances in inclines. For example, when a vehicle is traveling up a steep hill at an incline, the gimbal assembly 124 may permit the receptacle to stay level with respect to gravity, regardless of the vehicle's incline. That is, the fluid line L may be level, even though the vehicle, and subsequently the outer frame 104, is not.

As shown in FIG. 5, the inner cover 108 and outer cover 110 may move with the third inner gimbal 126C and the first outer gimbal 126A, respectively. That is, as the first gimbal 126A rotates, so does the outer cover 110. The covers 108, 110 may cover the gimbal assembly 124 from view of the user, creating a more aesthetically pleasing assembly. Furthermore, the covers 108, 110 may protect the gimbal assembly 124. For example, the covers 108, 110 may prevent objects from getting caught within the gimbals 126.

In addition to these features, the covers 108, 110 may also function as a stop in the event of extreme overcorrecting by the gimbals 126. In the example shown in FIG. 5, in the second position, the distal end 132 of the outer cover may abut the second middle gimbal 126B if the middle gimbal 126B continues to rotate upward.

Figure 6:
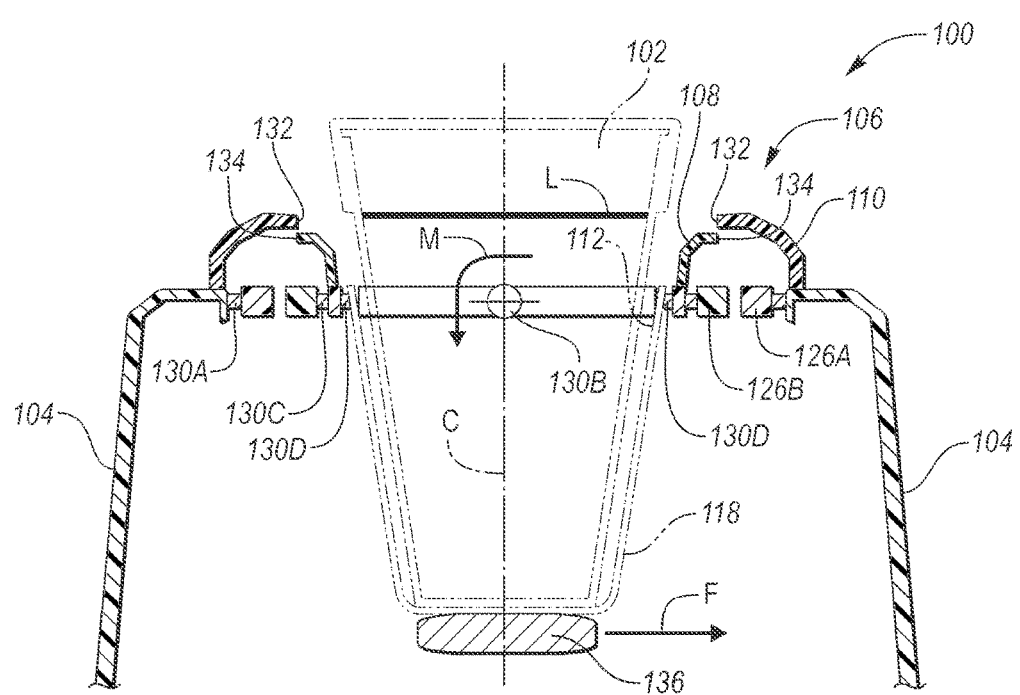
FIG. 6 illustrates a force diagram of the beverage holder assembly.

FIG. 6 illustrates an example force diagram showing a receptacle 118 and a beverage container 102 arranged therein in phantom. Similar to FIG. 5, FIG. 6 illustrates a pivot 130B, a fluid line L, a center of gravity C, and a momentum of inertia M. When the beverage container 102 is relatively full, that is, the fluid line L is close to the top of the beverage container 102 (e.g., approximately at least 75% full), the center of gravity C may be below the location of the pivots 130. When the vehicle changes momentum, and in this example when the vehicle brakes, the momentum of inertia M may be recognized. The higher the deceleration of the vehicle caused by the braking, the higher the momentum of inertia M. Upon braking, the weight 136 may generate an inertial force F.

Accordingly, a beverage container assembly for a vehicle is disclosed herein for stabilizing a receptacle thereof via a gimbal assembly and a weight arranged at a bottom of the receptacle. While the examples described herein relate to vehicles, and specifically automobiles, other vehicles such as boats, motorcycles, bicycles, etc., may also appreciate the assemblies described herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A beverage container holder, comprising:
   a beverage container receptacle;
   a gimbal set including outer, middle and inner gimbals surrounding and connected to the receptacle to correct a position of the receptacle in response to an external force; and
   an outer cover extending from the outer gimbal and having a first position extending over at least a portion of the middle gimbal and a second position contacting the middle gimbal to inhibit the external force.

2. The holder of claim 1, wherein the outer cover is extending from the outer gimbal and configured to cover the outer gimbal and at least a portion of the middle gimbal.

3. The holder of claim 2, wherein each of the outer, middle and inner gimbals is configured to rotate about an axis, an inner cover extending from the inner gimbal and configured to rotate with the inner gimbal.

4. The holder of claim 3, wherein the outer cover extends upward from the outer gimbal to form an arch that opens inwardly towards the receptacle.

5. The holder of claim 4, wherein the inner cover extends upward from the inner gimbal to form an arch that opens towards the outer gimbal.

6. The holder of claim 5, wherein a distal end of the inner cover is spaced from a distal end of the outer cover.

7. The holder of claim 1, further comprising a weight arranged at a bottom of the receptacle to inhibit the external force.

8. The holder of claim 7, wherein the weight is a steel washer.

9. A vehicle beverage holder, comprising:
   a receptacle configured to receive a beverage container;
   a gimbal set including outer, middle and inner gimbals surrounding and connected to the receptacle to correct a position of the receptacle in response to an external force;
   an outer cover extending from the outer gimbal and configured to cover the outer gimbal and at least a portion of the middle gimbal; and
   a weight arranged at a bottom of the receptacle to counteract the external force and to inhibit the external force.

10. The holder of claim 9, wherein each of the outer gimbal, the middle gimbal and the inner gimbal are configured to rotate with the receptacle.

11. The holder of claim 10, further comprising an inner cover extending from the inner gimbal and configured to cover the inner gimbal and at least a portion of the middle gimbal.

12. The holder of claim 11, wherein the outer cover is configured to contact the middle gimbal to counteract the external force.

13. The holder of claim 9, wherein the weight is a steel washer.

14. A beverage holder, comprising:
   a receptacle configured to receive a beverage container;
   a gimbal set including outer, middle and inner gimbals surrounding and connected to the receptacle to correct a position of the receptacle in response to an external force;
   an outer cover extending from the outer gimbal and, in a first position, covering a portion of the middle gimbal and, in a second position, contacting the middle gimbal to counteract the external force.

15. The holder of claim 14, further comprising a weight arranged at a bottom of the receptacle to counteract the external force and correct a position of the receptacle in response to the external force.

* * * * *